United States Patent
Guo et al.

(10) Patent No.: US 12,363,739 B2
(45) Date of Patent: Jul. 15, 2025

(54) SIDELINK ROBUSTNESS ENHANCEMENT FOR MULTI-TRP UE

(71) Applicant: QUALCOMM Incorporated, San Diego, CA (US)

(72) Inventors: Hui Guo, Beijing (CN); Kapil Gulati, Belle Mead, NJ (US); Junyi Li, Fairless Hills, PA (US); Shuanshuan Wu, San Diego, CA (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/000,808

(22) PCT Filed: Jul. 8, 2020

(86) PCT No.: PCT/CN2020/100899
§ 371 (c)(1),
(2) Date: Dec. 5, 2022

(87) PCT Pub. No.: WO2022/006783
PCT Pub. Date: Jan. 13, 2022

(65) Prior Publication Data
US 2023/0232425 A1    Jul. 20, 2023

(51) Int. Cl.
*H04W 72/25* (2023.01)
*H04L 1/1822* (2023.01)
*H04L 5/00* (2006.01)
*H04W 72/044* (2023.01)

(52) U.S. Cl.
CPC .......... *H04W 72/25* (2023.01); *H04L 1/1822* (2013.01); *H04L 5/0035* (2013.01); *H04W 72/044* (2013.01)

(58) Field of Classification Search
None
See application file for complete search history.

(56) References Cited

U.S. PATENT DOCUMENTS

| | | | | |
|---|---|---|---|---|
| 2018/0132168 | A1* | 5/2018 | Ingale | H04W 72/23 |
| 2018/0359707 | A1 | 12/2018 | Chae | |
| 2019/0149274 | A1* | 5/2019 | Freda | H04L 1/1819 370/329 |
| 2020/0106559 | A1* | 4/2020 | Vilaipornsawai | H04L 1/1896 |

(Continued)

FOREIGN PATENT DOCUMENTS

| | | |
|---|---|---|
| CN | 108605326 A | 9/2018 |
| CN | 110892765 A | 3/2020 |

(Continued)

OTHER PUBLICATIONS

International Search Report and Written Opinion—PCT/CN2020/100899—ISA/EPO—Mar. 25, 2021.

(Continued)

*Primary Examiner* — Otis L Thompson, Jr.
(74) *Attorney, Agent, or Firm* — Patterson + Sheridan, L.L.P.

(57) ABSTRACT

Certain aspects of the present disclosure provide techniques for enhancing sidelink communications between devices. As described herein, a single sidelink control information (SCI) may schedule sidelink data transmissions with repetition in time and/or frequency.

60 Claims, 16 Drawing Sheets

(56) References Cited

U.S. PATENT DOCUMENTS

| | | | |
|---|---|---|---|
| 2020/0112982 A1* | 4/2020 | Li | H04W 72/23 |
| 2020/0196255 A1* | 6/2020 | Cheng | H04W 56/001 |
| 2020/0336253 A1* | 10/2020 | He | H04W 76/11 |
| 2020/0351057 A1* | 11/2020 | Yeo | H04L 1/1854 |
| 2020/0396760 A1* | 12/2020 | Yi | H04W 72/23 |
| 2021/0127361 A1 | 4/2021 | Yasukawa et al. | |
| 2021/0136732 A1* | 5/2021 | Fakoorian | H04W 28/26 |
| 2021/0136742 A1* | 5/2021 | Huang | H04L 1/1822 |
| 2021/0150236 A1* | 5/2021 | Yu | G06V 20/56 |
| 2021/0219268 A1* | 7/2021 | Li | H04L 1/1819 |
| 2021/0392652 A1* | 12/2021 | Dutta | H04L 5/0064 |
| 2022/0095279 A1* | 3/2022 | Hwang | H04L 27/2602 |
| 2022/0109546 A1* | 4/2022 | Panteleev | H04L 5/0053 |
| 2022/0116916 A1* | 4/2022 | Zhao | H04W 72/0453 |
| 2022/0183002 A1* | 6/2022 | Yeo | H04L 1/1854 |
| 2022/0217768 A1* | 7/2022 | Liu | H04L 1/1874 |
| 2022/0377722 A1* | 11/2022 | Yao | H04L 5/0055 |
| 2023/0047819 A1* | 2/2023 | Ding | H04W 72/044 |
| 2023/0099975 A1* | 3/2023 | Hahn | H04W 80/08 370/329 |
| 2023/0189390 A1* | 6/2023 | Park | H04W 76/28 370/252 |

FOREIGN PATENT DOCUMENTS

| | | |
|---|---|---|
| CN | 110959301 A | 4/2020 |
| CN | 111316585 A | 6/2020 |
| EP | 3179793 A1 | 6/2017 |
| WO | 2017135126 A1 | 8/2017 |
| WO | 2020033088 A1 | 2/2020 |

OTHER PUBLICATIONS

Vivo: "Discussion on Mode 2 Resource Allocation Mechanism", 3GPP TSG RAN WG1 #96bis, R1-1904074, Apr. 2, 2019 (Apr. 2, 2019), 11 Pages, section 3.

Vivo: "Discussion on Resource Allocation Mechanism for NR V2X", 3GPP TSG RAN WG1 #96, R1-1903337, Feb. 22, 2019 (Feb. 22, 2019), 14 Pages, section 3.

Supplementary European Search Report—EP20944818—Search Authority—The Hague—Feb. 23, 2024.

\* cited by examiner

Aperiodic Reservation

Periodic Reservation

800

802

TRANSMIT A SIDELINK CONTROL INFORMATION (SCI) TO RESERVE RESOURCES FOR DATA TRANSMISSION TO AT LEAST ONE RECEIVER UE BY USING A REPETITION IN AT LEAST ONE OF TIME OR FREQUENCY

804

TRANSMIT THE DATA TO THE AT LEAST ONE RECEIVER UE, VIA AT LEAST FIRST AND SECOND TRANSMITTER RECEIVER POINTS (TRPS) OF THE TRANSMITTER UE, BY USING REPETITION ACCORDING TO THE SCI

RECEIVE, FROM A TRANSMITTER UE, A SIDELINK CONTROL INFORMATION (SCI) TO RESERVE RESOURCES FOR DATA TRANSMISSION TO AT LEAST A SECOND UE BY USING A REPETITION IN AT LEAST ONE OF TIME OR FREQUENCY

904

MONITOR FOR DATA TRANSMITTED FROM AT LEAST FIRST AND SECOND TRANSMITTER RECEIVER POINTS (TRPS) OF THE TRANSMITTER UE, BY USING THE REPETITION ACCORDING TO THE SCI

SIDELINK ROBUSTNESS ENHANCEMENT FOR MULTI-TRP UE

CROSS-REFERENCE TO RELATED APPLICATIONS

This application is a national stage application under 35 U.S.C. 371 of PCT/CN2020/100899 filed Jul. 8, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to enhancing device-to-device sidelink communication by a user equipment (UE) with multiple transmitter receiver points (mTRP).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a transmitter UE. The method generally includes transmitting a sidelink control information (SCI) to reserve resources for data transmission to at least one receiver UE by using a repetition in at least one of time or frequency and transmitting the data to the at least one receiver UE, via at least first and second transmitter receiver points (TRPs) of the transmitter UE, by using repetition according to the SCI.

Certain aspects provide a method for wireless communication by a receiver UE. The method generally includes receiving, from a transmitter UE, a sidelink control information (SCI) to reserve resources for data transmission to at least a second UE by using a repetition in at least one of time or frequency and monitoring for data transmitted from at least first and second transmitter receiver points (TRPs) of the transmitter UE, by using the repetition according to the SCI.

Certain aspects provide a transmitter UE. The transmitter UE generally includes means for transmitting a sidelink control information (SCI) to reserve resources for data transmission to at least one receiver UE by using a repetition in at least one of time or frequency and means for transmitting the data to the at least one receiver UE, via at least first and second transmitter receiver points (TRPs) of the transmitter UE, by using repetition according to the SCI.

Certain aspects provide a receiver UE. The receiver UE generally includes means for receiving, from a transmitter UE, a sidelink control information (SCI) to reserve resources for data transmission to at least a second UE by using a repetition in at least one of time or frequency and means for monitoring for data transmitted from at least first and second transmitter receiver points (TRPs) of the transmitter UE, by using the repetition according to the SCI.

Certain aspects provide a transmitter UE. The transmitter UE generally includes a transmitter configured to transmit a sidelink control information (SCI) to reserve resources for data transmission to at least one receiver UE by using a repetition in at least one of time or frequency and transmit the data to the at least one receiver UE, via at least first and second transmitter receiver points (TRPs) of the transmitter UE, by using repetition according to the SCI.

Certain aspects provide a receiver UE. The receiver UE generally includes a receiver configured to receive, from a transmitter UE, a sidelink control information (SCI) to reserve resources for data transmission to at least a second UE by using a repetition in at least one of time or frequency and a processing system configured to monitor for data transmitted from at least first and second transmitter receiver points (TRPs) of the transmitter UE, by using the repetition according to the SCI.

Certain aspects provide an apparatus for wireless communications by a transmitter UE. The apparatus generally includes a processing system configured to generate a sidelink control information (SCI) to reserve resources for data transmission to at least one receiver UE and data; and an interface configured to output the sidelink control information (SCI) for transmission by using a repetition in at least one of time or frequency and the data for transmission to the at least one receiver UE, via at least first and second transmitter receiver points (TRPs) of the transmitter UE, by using repetition according to the SCI.

Certain aspects provide an apparatus for wireless communications by a receiver UE. The apparatus generally includes an interface configured to receive, from a transmitter UE, a sidelink control information (SCI) to reserve resources for data transmission to at least a second UE by using a repetition in at least one of time or frequency and a processing system configured to monitor for data transmitted from at least first and second transmitter receiver points (TRPs) of the transmitter UE, by using the repetition according to the SCI.

Certain aspects provide a computer-readable medium for wireless communications by a transmitter UE. The computer-readable medium generally includes codes executable to transmit a sidelink control information (SCI) to reserve resources for data transmission to at least one receiver UE by using a repetition in at least one of time or frequency and transmit the data to the at least one receiver UE, via at least first and second transmitter receiver points (TRPs) of the transmitter UE, by using repetition according to the SCI.

Certain aspects provide a computer-readable medium for wireless communications by a receiver UE. The computer-readable medium generally includes codes executable to receive, from a transmitter UE, a sidelink control information (SCI) to reserve resources for data transmission to at least a second UE by using a repetition in at least one of time or frequency and monitor for data transmitted from at least first and second transmitter receiver points (TRPs) of the transmitter UE, by using the repetition according to the SCI.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 illustrates example operations for wireless communications by a transmitter UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
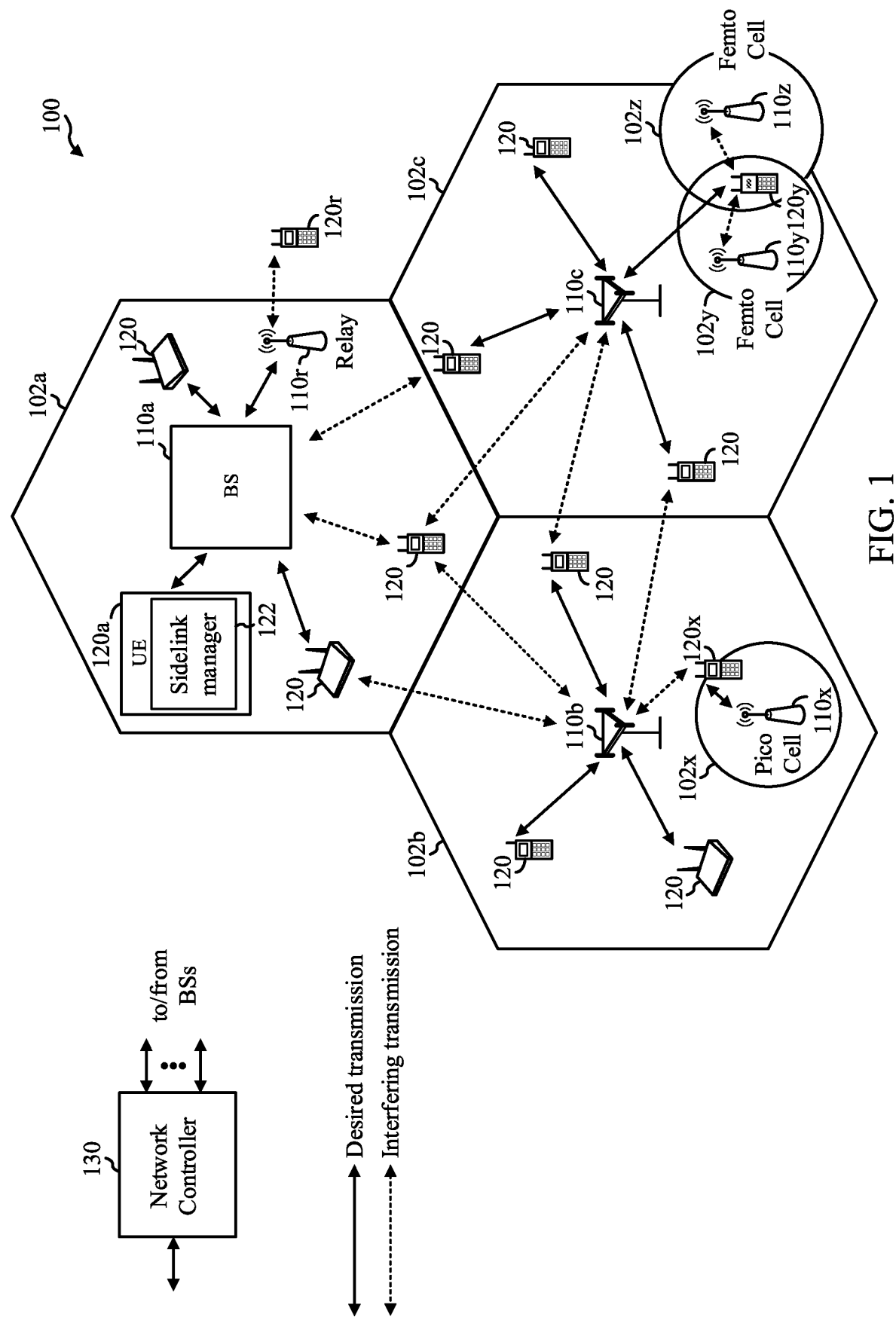
FIG. 1 is a block diagram conceptually illustrating an example telecommunications system, in accordance with certain aspects of the present disclosure.

Aspects of the present disclosure provide apparatus, methods, processing systems, and computer readable mediums for enhancing device-to-device sidelink communication by a user equipment (UE) with multiple transmitter receiver points (mTRP). As will be described in greater detail below, a single sidelink control information (SCI) may schedule a sidelink data communication that is enhanced by using repetition in time and/or frequency.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120a of FIG. 1 may include a sidelink manager 122 configured to perform (or used by UE 120a to perform) operations described below with reference to FIG. 8 or 9 for sidelink data transmissions that utilize repetition in time and/or frequency.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
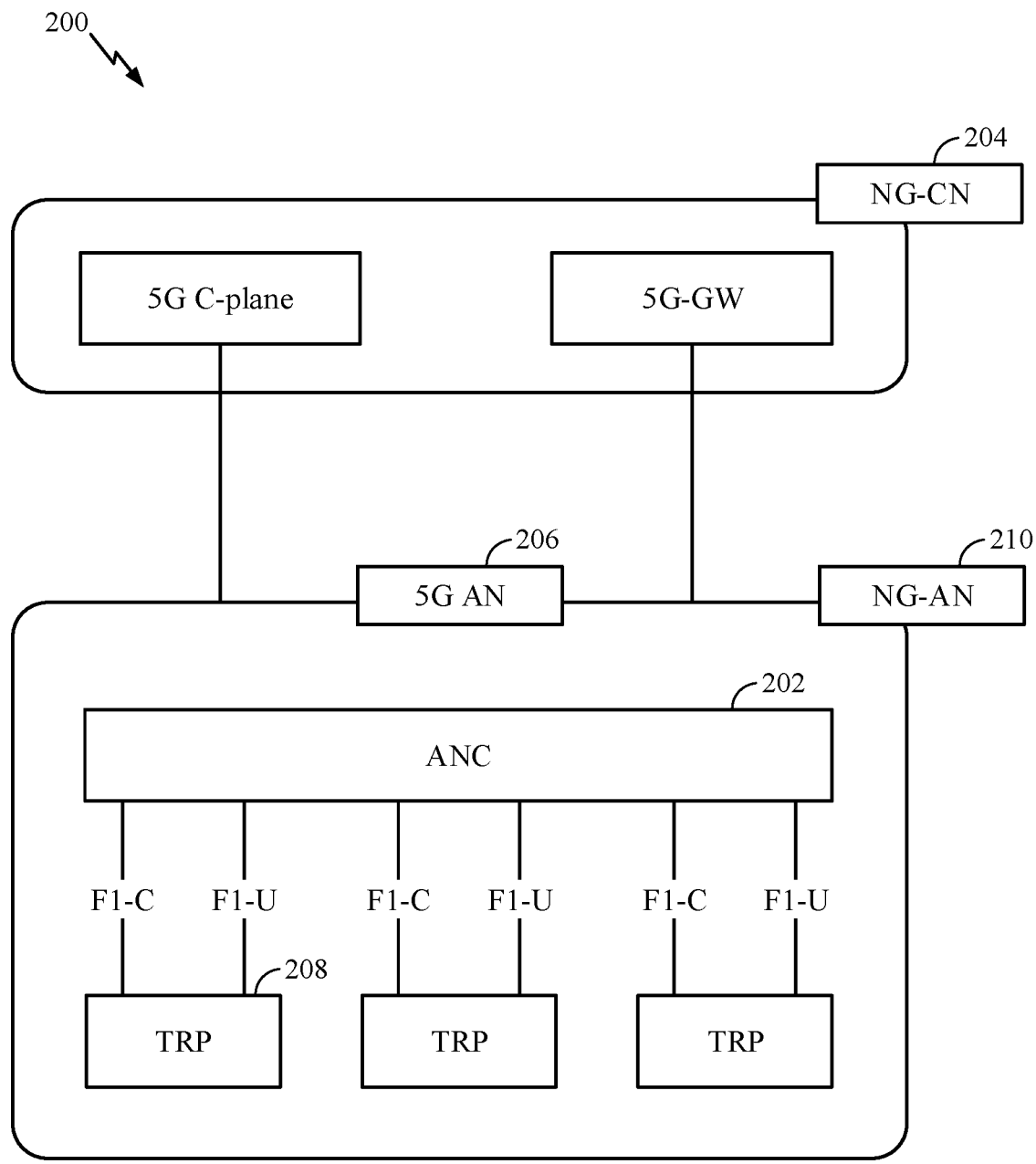
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
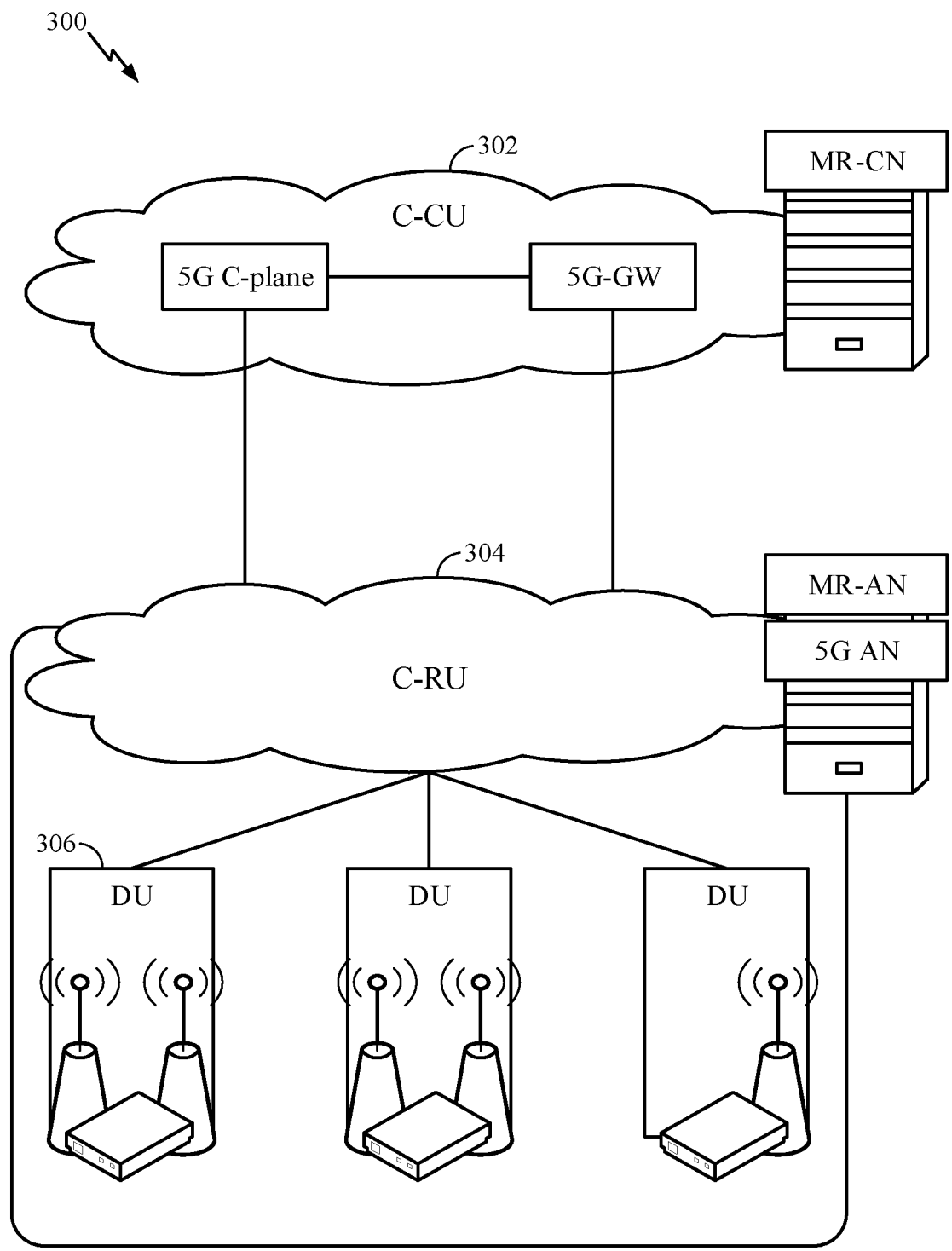
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
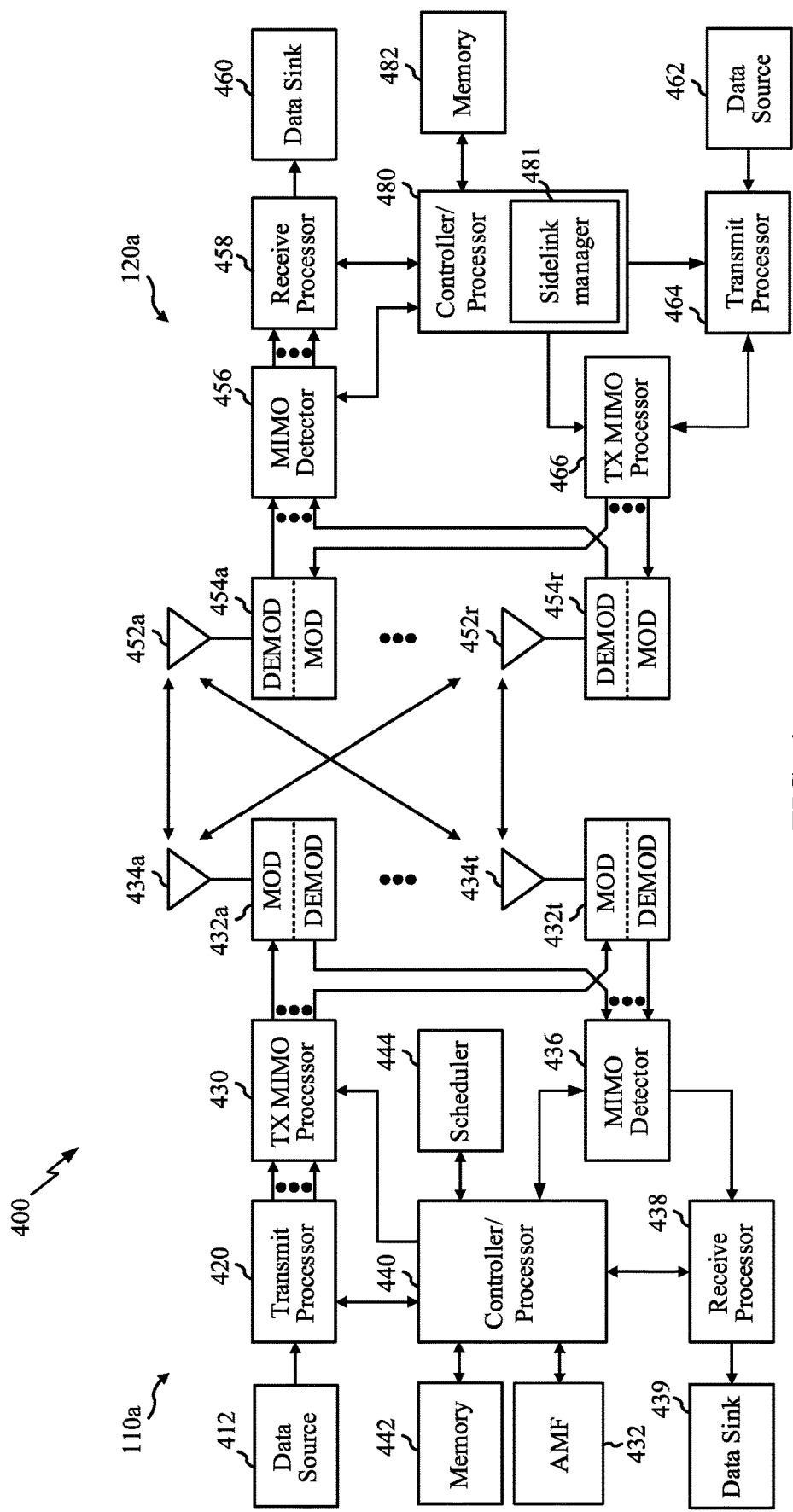
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIGS. 8 and/or 9.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 2, the controller/processor 480 of the UE 120a has a sidelink manager 481 that may be configured for transmitting a sidelink communication to another UE. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figures 5A, 5B:
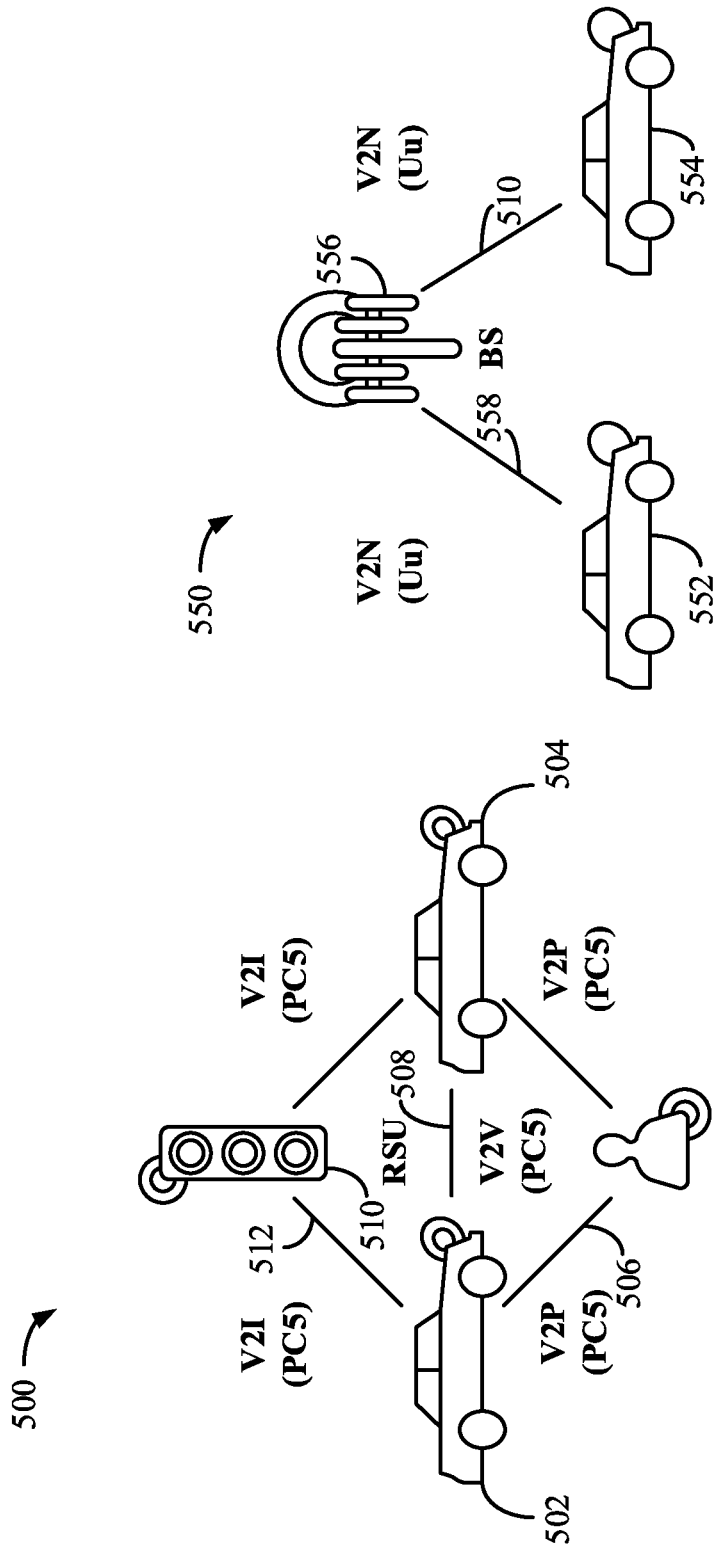
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
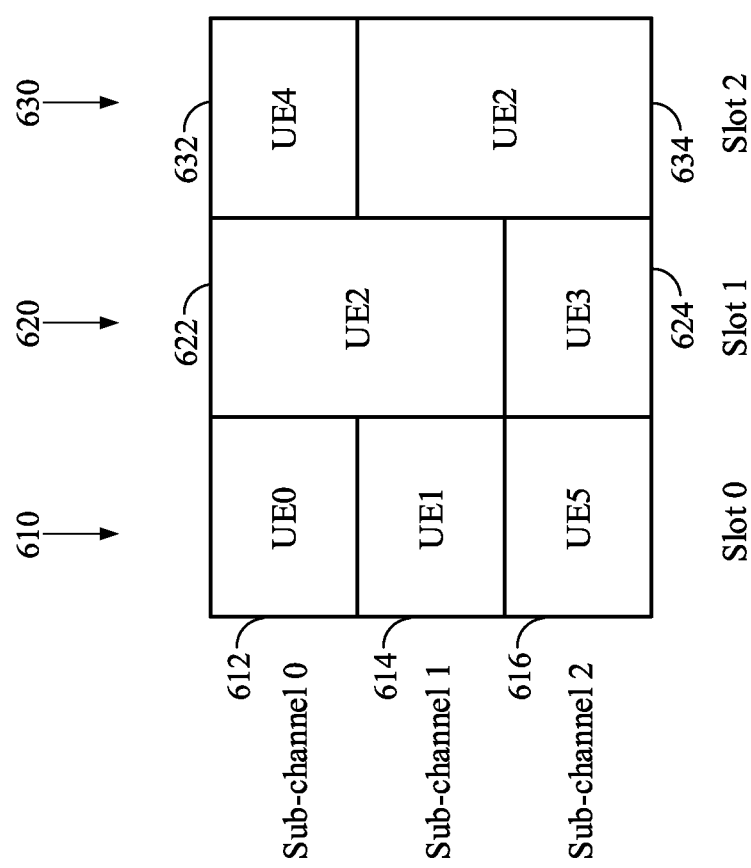
FIG. 6 illustrates example resources for sidelink communications, in accordance with certain aspects of the present disclosure.

FIG. 6 is an example of time frequency resources 600 for sidelink communications (broadcast and groupcast device-to-device or D2D) between UEs (e.g., UEs 110, shown in FIG. 1). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2.

Example Sidelink Robustness Enhancement for mTRP UE

Aspects of the present disclosure relate to wireless communications, and more particularly, to enhancing device-to-device sidelink communication by a user equipment (UE) with multiple transmitter receiver points (an mTRP UE).

mTRPs may be utilized in current and advanced systems (such as 5G/NR) to improve reliability, coverage, and capacity performance through flexible deployment scenarios. One example mTRP scenario is to have a vehicle equipped with TRPs located in different part of the vehicle. This type of deployment may help improve reliability in safety and other high robustness desired applications.

In some cases, mTRP at the vehicles may be used in an effort to achieve 360 degree coverage around a vehicle. This type of coverage (e.g., at 90+degree elevations) may be particularly desirable for larger vehicles like trucks pulling trailers. In such cases, different TRPs may be located at a roof-top-rear and front-bumper for a truck as opposed on roof-top-rear only.

Figure 7A:
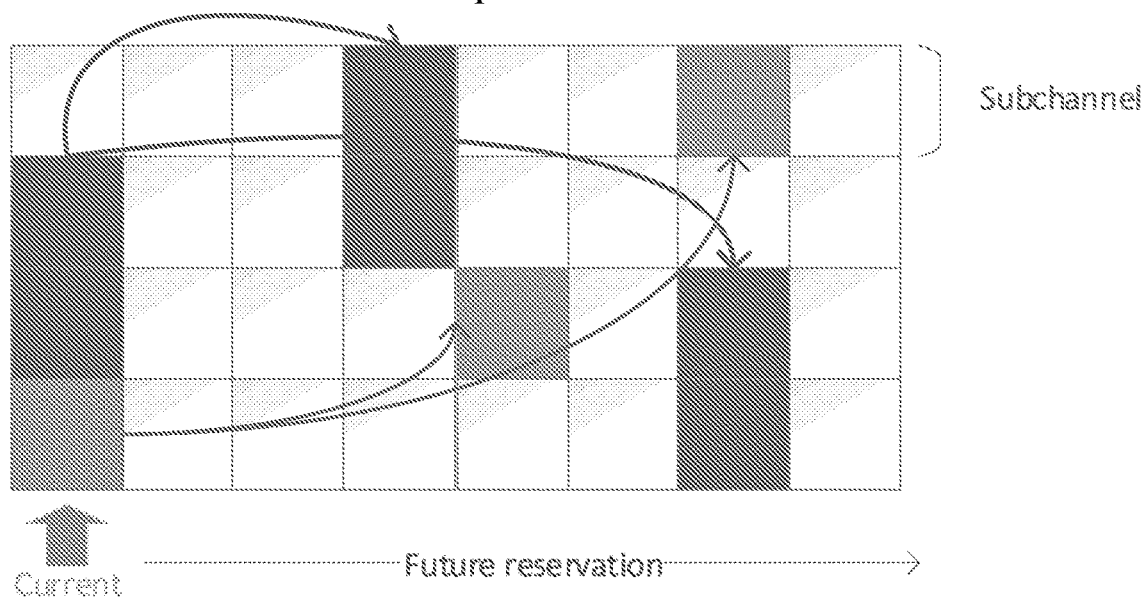
FIGS. 7A and 7B illustrate example resources for sidelink communications, in accordance with certain aspects of the present disclosure.
Figure 7B:
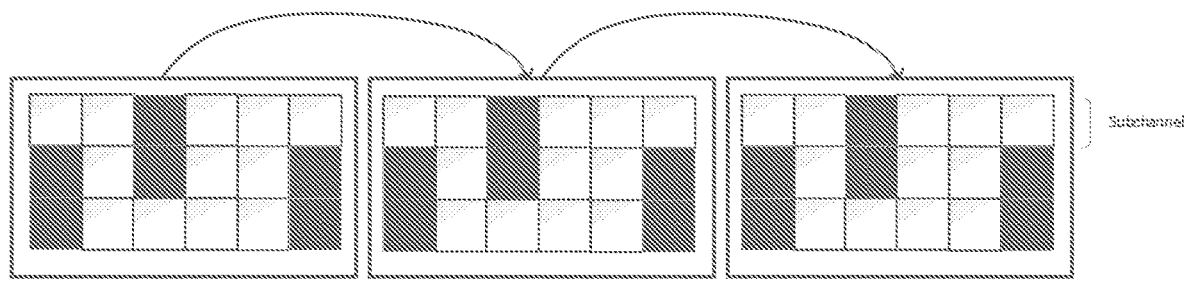

Such mTRP applications may involve V2X sidelink communications. As illustrated in FIGS. 7A and 7B, both periodic and aperiodic transmission may be supported in NR V2X designs.

As illustrated in FIG. 7A, a transmission in a current slot may reserve resources in the current slot and in up to two future slots. The reservation information may be carried in sidelink control information (SCI). As noted above, the resource allocation may be in units of sub-channels in the frequency domain and may be limited to one slot in the time domain.

As illustrated in FIG. 7B, a period (e.g., with configurable values between 0ms and 1000 ms), can also be signaled in SCI. Periodic resource reservation and signaling may be enabled and/or disabled by (pre)configuration.

Aspects of the present disclosure propose various options for coverage/robustness enhancements for mTRP UEs. In some cases, time division multiplexed (TDM) and/or frequency division multiplexed (FDM) schemes, based on a single-SCI structure may be used to schedule sidelink data transmissions with repetition in the time domain and/or the frequency domain.

FIG. 8 illustrates example operations 800 performed by a transmitter UE, in accordance with certain aspects of the present disclosure. For example, operations 800 may be performed by a UE (e.g., UE 120 of FIG. 1 or FIG. 4) to send a (single SCI) to schedule (reserve resources for) sidelink data transmissions with repetition in time and/or frequency.

Operations 800 begin, at 802, by transmitting a sidelink control information (SCI) to reserve resources for data transmission to at least one receiver UE by using a repetition in at least one of time or frequency.

At 804, the transmitter UE transmits the data to the at least one receiver UE, via at least first and second transmitter receiver points (TRPs) of the transmitter UE, by using repetition according to the SCI.

Figure 9:
FIG. 9 illustrates example operations for wireless communications by a receiver UE, in accordance with certain aspects of the present disclosure.

FIG. 9 illustrates example operations 900 that may be considered complementary to operations 800 of FIG. 8. For example, 900 may be performed by a receiver UE to process data transmissions sent with repetition by a transmitter UE (performing operations 800 of FIG. 8).

Operations 900 begin, at 902, by receiving, from a transmitter UE, a sidelink control information (SCI) to reserve resources for data transmission to at least a second UE by using a repetition in at least one of time or frequency.

At 904, the receiver UE monitors for data transmitted from at least first and second transmitter receiver points (TRPs) of the transmitter UE, by using the repetition according to the SCI.

Figure 10:
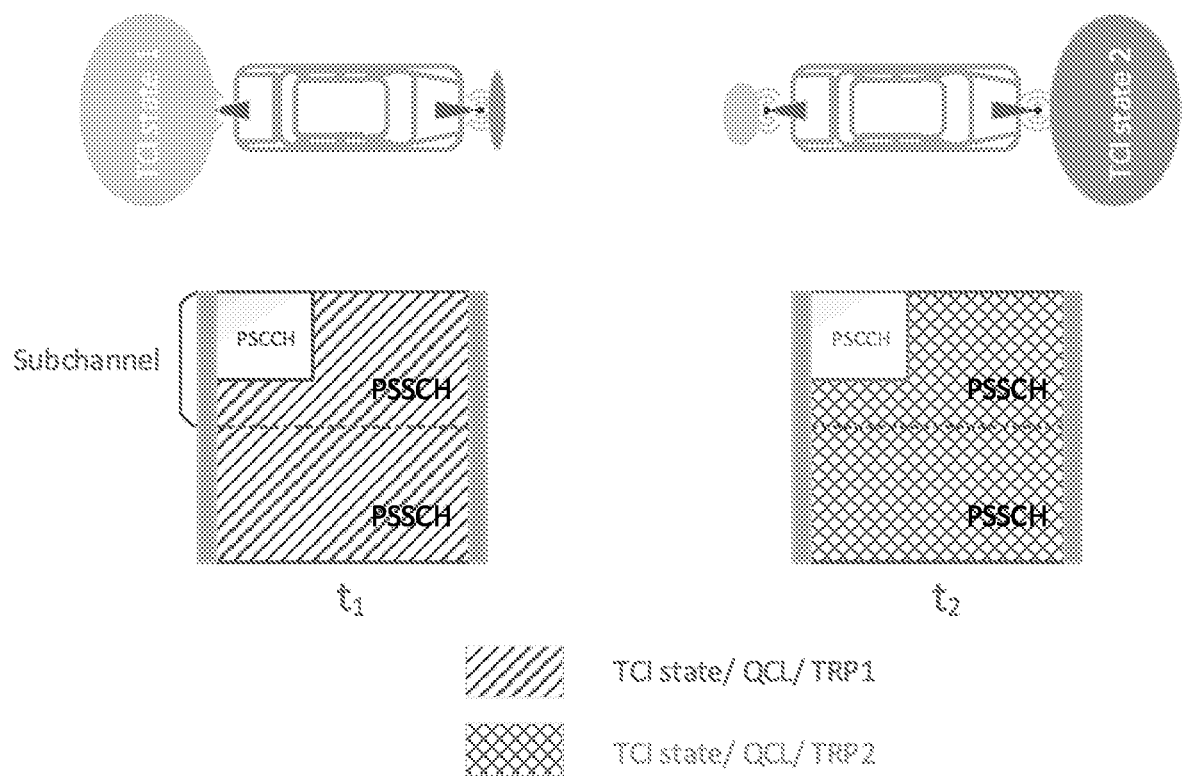
FIG. 10 illustrates an example of sidelink communications with repetition, in accordance with certain aspects of the present disclosure.

In a TDM scheme, the mTRP UE may switch TRPs to alternate transmission between the multiple TRPs. FIG. 10 illustrates an example of such a scheme involving an mTRP UE with 2 TRPs (TRP-1 and TRP-2).

In some cases, the transmitting UE may randomize how it chooses a TRP for any particular repetition or it could cycle through TRPs or precoders (e.g., to split power allocation across the TRPs) over multiple (re)transmission of a packet to achieve 360 degree coverage (e.g., as shown with front and rear TRPs each covering approximately 180 degrees).

The mTRP deployment shown may be useful, for example, to enhance robustness for sensor sharing message transmissions from a vehicle equipped with mTRP. Sensing packet transmissions sent with repetition by switching between TRP-1 and/or TRP-2 in time may result in better coverage.

As shown, at time t1 PSSCH may be transmitted from TRP-1 with a first TCI state/QCL assumptions. At time t2, the PSSCH (same transport block/TB) may be retransmitted from TRP-2 with a second TCI state/QCL assumptions.

In some cases, various TDM schemes may be enabled by configuring them from a transmitter UE higher layer and signaled to receiver UEs, for example, via an SCI-2 or MAC-CE.

Figure 11:
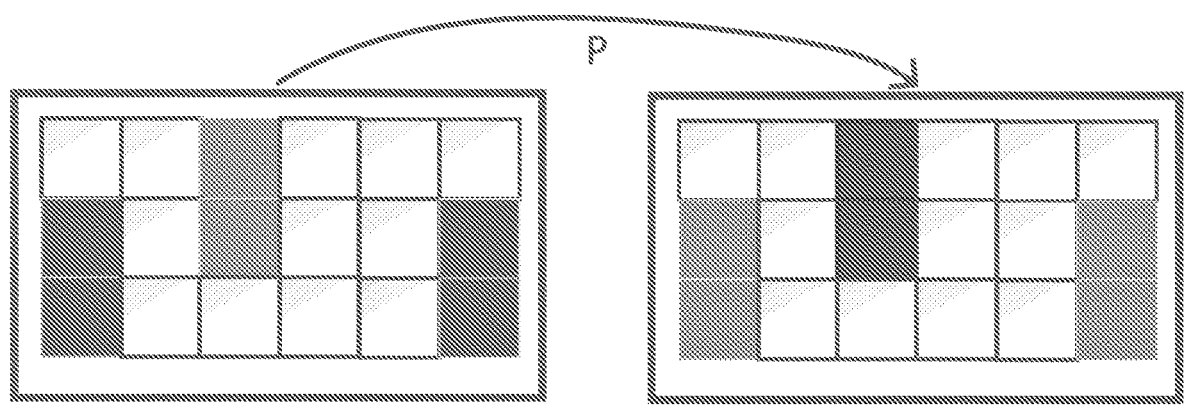
FIG. 11 illustrates an example of sidelink communications with repetition, in accordance with certain aspects of the present disclosure.

As illustrated in FIG. 11, in some cases, TB repetition may be based on slot aggregation to enhance the coverage. In such cases, repetition of the same TB may be transmitted from different TCI states/TRPs within one resource reservation window.

In some cases, a $1^{st}$ stage SCI may indicate the frequency and time resource assignment, in a similar manner as a single TRP case, while the TCI state indication may be signaled via a $2^{nd}$ stage SCI or MAC CE.

With the illustrated slot aggregation based repetition, the transmitter UE may decide the transmitted redundancy version (RV) for each hybrid automatic repeat request (HARQ) process and TCI state. In such cases, the receiver UE may then perform HARQ combining based on the HARQ process ID and RV indication.

As noted above, in some cases, the TCI state indication may be via a $2^{nd}$ stage SCI, which may indicate other information, such as the HARQ Process ID and Redundancy version. In other cases, the TCI state may be indicated via a MAC CE or via a MAC CE and SCI-2.

In some case, a receiver UE may report channel state information (CSI) based on each TCI state. In some cases, the reported CSI may be based on an optimized measurement of the two TCI states.

Figure 12A:
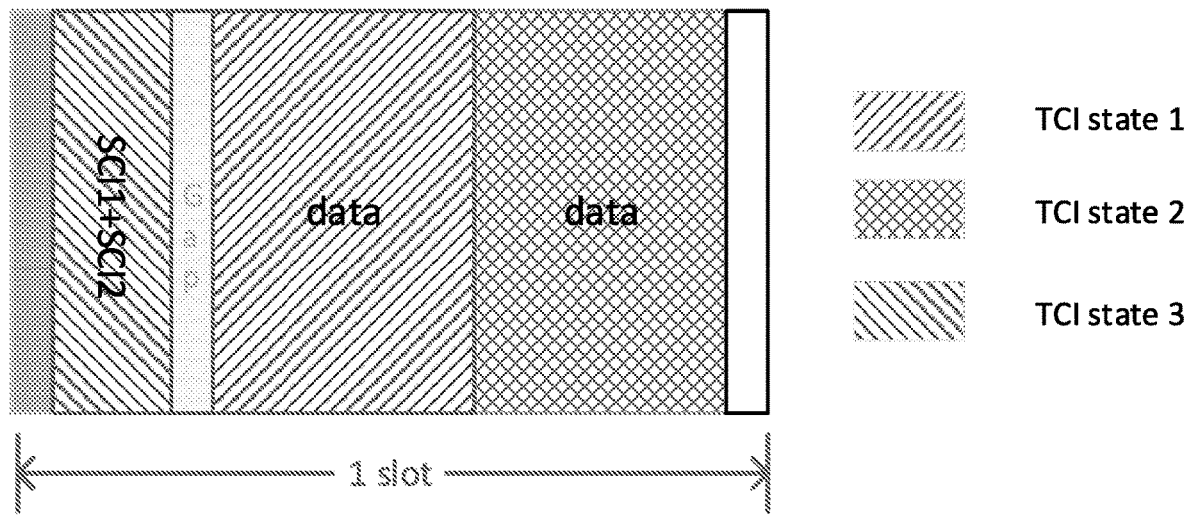
FIGS. 12A and 12B illustrate examples of sidelink communications with repetition, in accordance with certain aspects of the present disclosure.
Figure 12B:
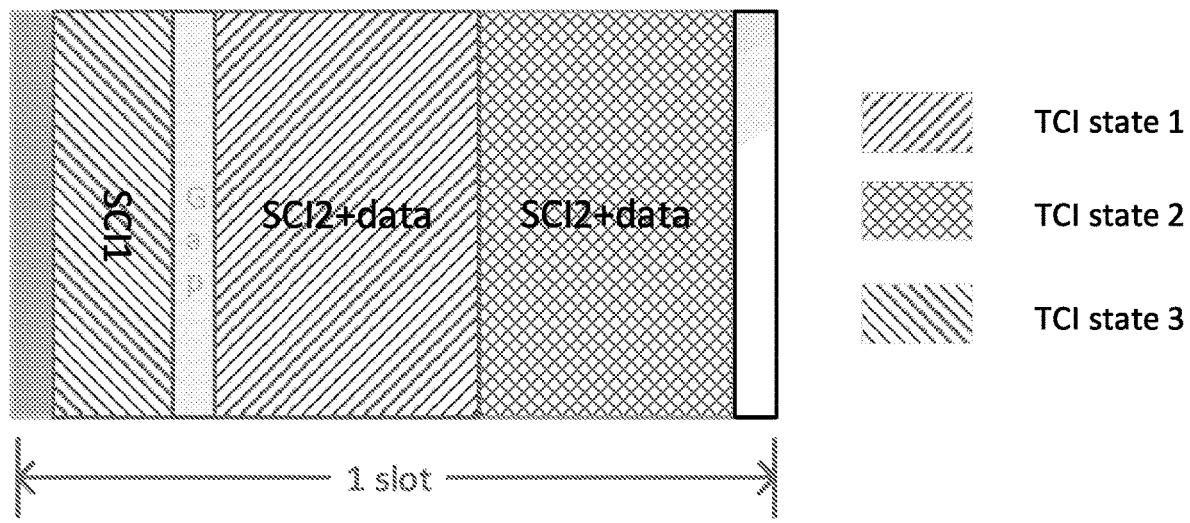

As illustrated in FIGS. 12A and 12B, in some cases, intra-slot repetition may be used. As illustrated in FIG. 12A, in some cases, to improve control coverage, SCI-1 and SCI-2 may be sent from both TRPs (marked as TCI state 3 in FIG. 12A) with a certain power split ratio (between TRPs).

As illustrated, the SCI-1/SCI-2 transmission may be followed by a gap symbol, data transmission with TCI state 1 and 2, respectively, all within one slot. As illustrated, there may be 2 repetitions corresponding to the 2 TRPs (TCI states). The gap symbol length and symbol number for each repetition within the slot can be configured via 2nd stage SCI (e.g., which may also carry HARQ Process ID, Redundancy version, and the TCI indication). In some cases, the RV iteration of each repetition may follow a defined pattern (e.g., defined in NR release 15).

As illustrated in FIG. 12B, in another case, $2^{nd}$ stage SCI may be transmitted in each repetition. In this case, the data conveyed (and format of) SCI-2 may be different than the SCI-2 used in the example shown in FIG. 12A.

Figure 13:
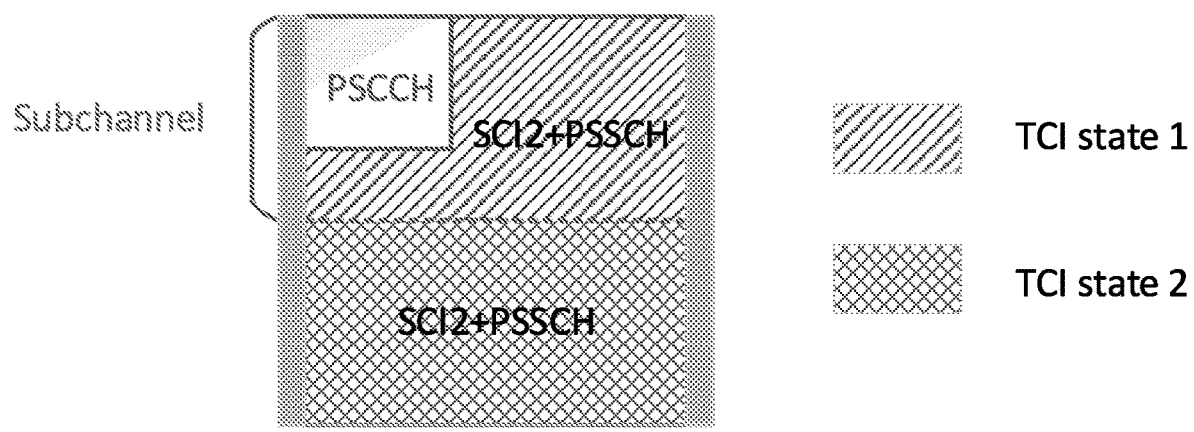
FIG. 13 illustrates an example of sidelink communications with repetition, in accordance with certain aspects of the present disclosure.

As illustrated in FIG. 13, in some cases, repetitions may be sent according to a single SCI based FDM scheme using wideband precoding resource block groups (PRG). As illustrated, SCI-1 may be transmitted on the first subchannel along with the associated data transmission by (e.g., TCI state 1).

SCI-2 could be repeated in both half transmissions, with indications/contents of two repetitions in each frequency resource field. In some cases, the FDM mode format in SCI-2 may be defined to indicate the resource reservation pattern with multi-TRPs (e.g., including TCI state, RV pattern, etc.).

A receiver UE would typically expect no PSCCH in the second half SCI-1 with a single-SCI based scheme. The receiver UE may expect the same or a different RV from the two different half resources, by RV indication in SCI-2.

In some cases, the resource selection may be based on own TRP RSRP measurements and the second half transmission may be considered as a backup detection occasion for coverage enhancement. One advantage of this approach is that it may be based on a current SCI design, with little or no change required to the SCI-1 format.

Figure 14A:
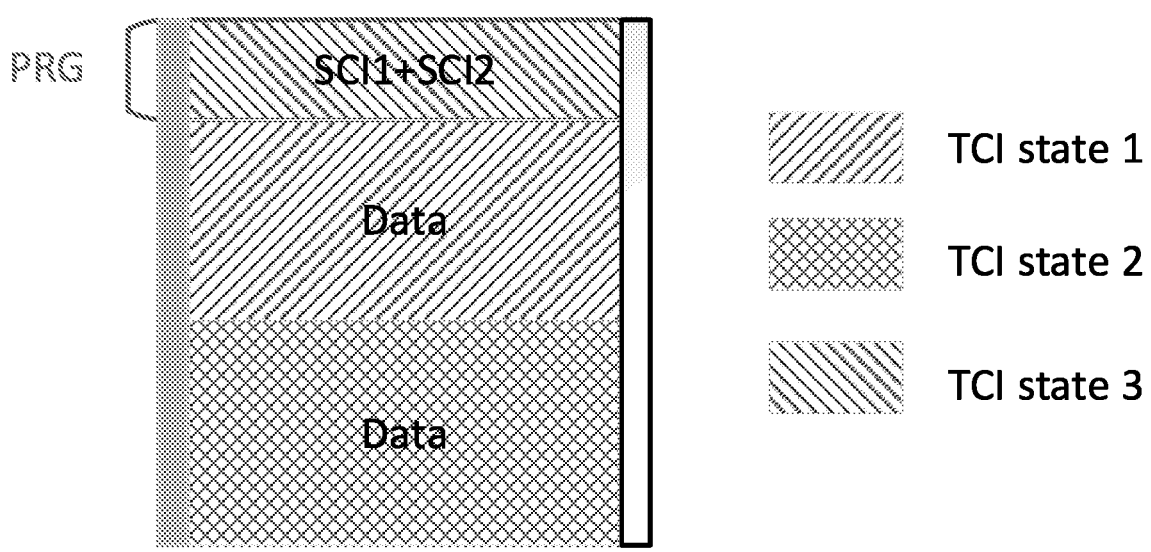
FIGS. 14A and 14B illustrate examples of sidelink communications with repetition, in accordance with certain aspects of the present disclosure.
Figure 14B:
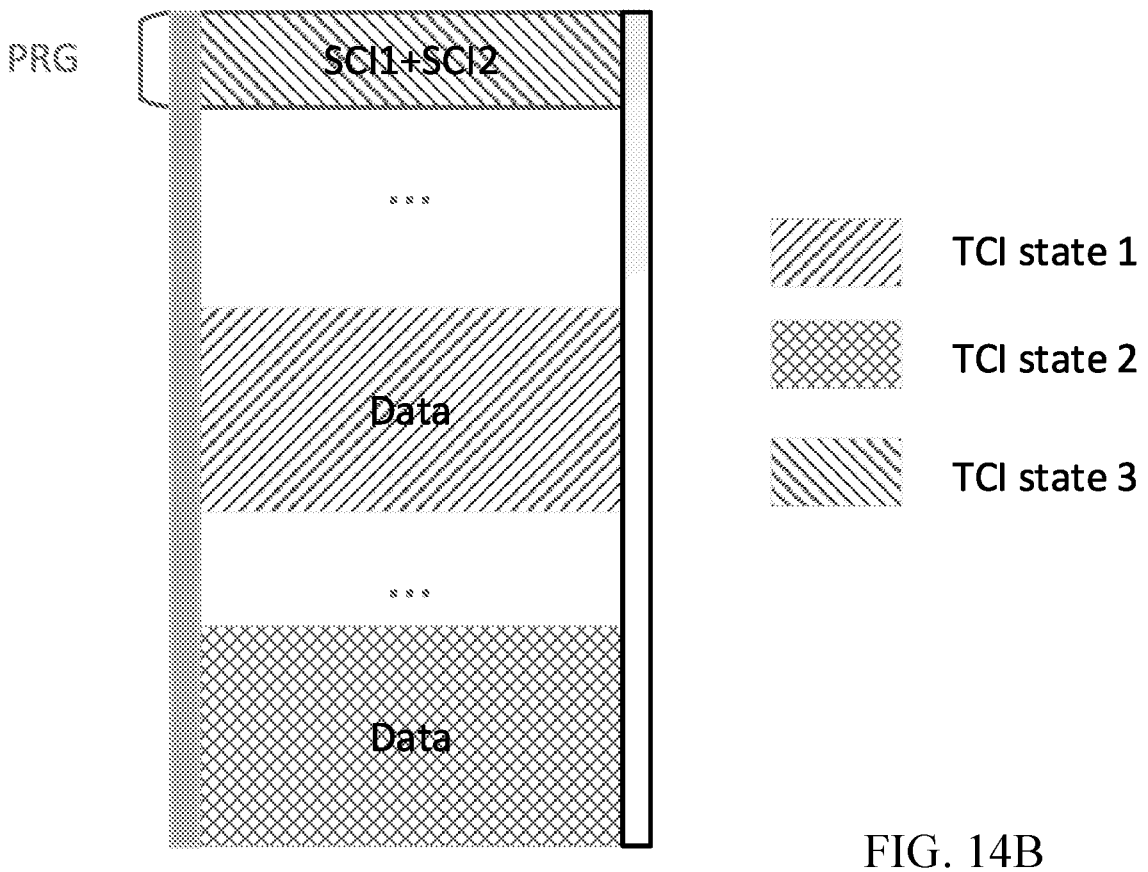

As illustrated in FIGS. 14A and 14B, in some cases, repetitions may be sent according to a single SCI based FDM scheme using a narrowband PRG resource allocation scheme.

With the PRG narrowband resource allocation scheme, FDM may be enabled with a single-SCI based format. As illustrated, to have a better (e.g., balanced) coverage for control information, a wideband-like TCI state may be indicated as SCI-1+SCI-2 transmission.

FIG. 14A illustrates a continuous PRG narrow band allocation with FDM scheme, while FIG. 14B illustrates a non continuous PRG narrow band allocation with FDM scheme. In some cases, the non continuous PRG narrow band allocation may be used in an effort to achieve additional frequency division gain. As illustrated, in either case, data transmissions may be repeated with multiple TCI states (e.g., with the TCI states indicated in SCI-2 as described above).

By scheduling (e.g., via a single SCI) sidelink data transmissions with repetition in the time and/or frequency domain, aspects of the present disclosure may be used to achieve more robust sidelink communications.

Figure 15:
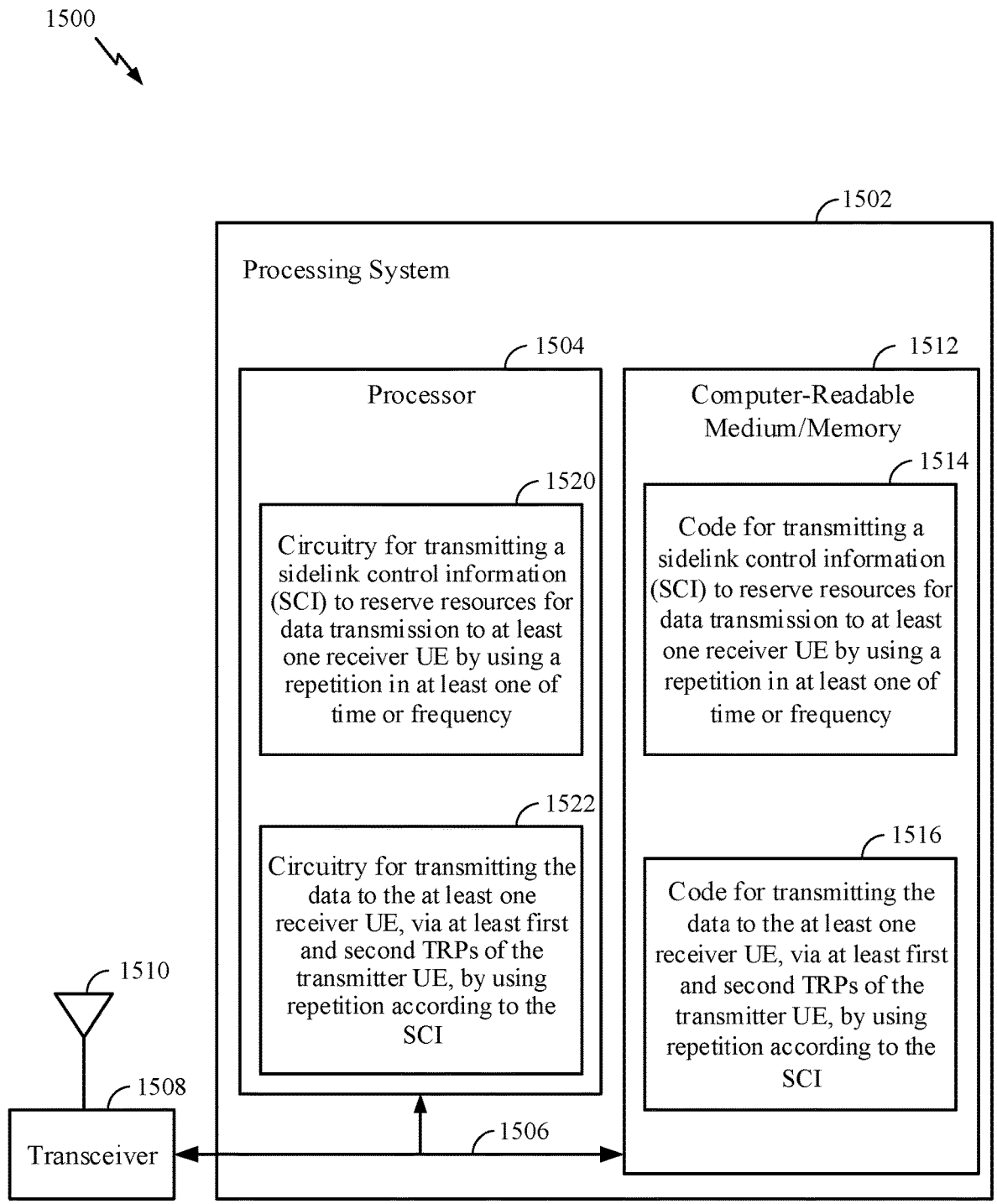
FIG. 15 illustrates a communications device that may include various components configured to perform the operations illustrated in FIG. 8, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8. In certain aspects, computer-readable medium/memory 1512 stores code 1514 for transmitting a sidelink control information (SCI) to reserve resources for data transmission to at least one receiver UE by using a repetition in at least one of time or frequency and code 1516 for transmitting the data to the at least one receiver UE, via at least first and second transmitter receiver points (TRPs) of the transmitter UE, by using repetition according to the SCI. In certain aspects, the processor 1504 has circuitry configured to implement the code stored in the computer-readable medium/memory 1512. The processor 1504 includes circuitry 1520 for transmitting a sidelink control information (SCI) to reserve resources for data transmission to at least one receiver UE by using a repetition in at least one of time or frequency and circuitry 1522 for transmitting the data to the at least one receiver UE, via at least first and second transmitter receiver points (TRPs) of the transmitter UE, by using repetition according to the SCI.

Figure 16:
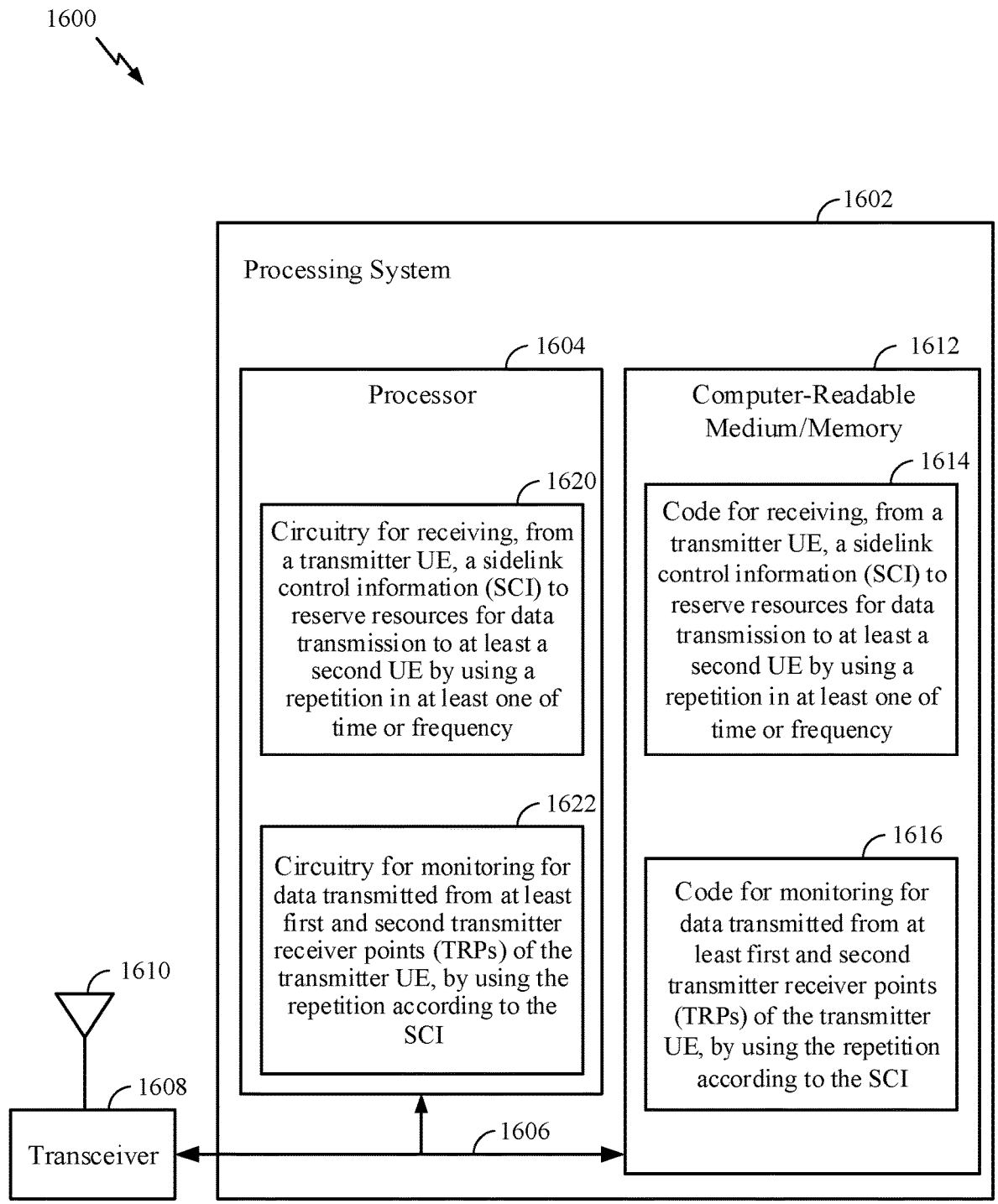
FIG. 16 illustrates a communications device that may include various components configured to perform the operations illustrated in FIG. 9, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 9. In certain aspects, computer-readable medium/memory 1612 stores code 1614 receiving, from a transmitter UE, a sidelink control information (SCI) to reserve resources for data transmission to at least a second UE by using a repetition in at least one of time or frequency and code 1616 for monitoring for data transmitted from at least first and second transmitter receiver points (TRPs) of the transmitter UE, by using the repetition according to the SCI. In certain aspects, the processor 1604 has circuitry configured to implement the code stored in the computer-readable medium/memory 1612. The processor 1604 includes circuitry 1620 for receiving, from a transmitter UE, a sidelink control information (SCI) to reserve resources for data transmission to at least a second UE by using a repetition in at least one of time or frequency and circuitry 1622 for monitoring for data transmitted from at least first and second transmitter receiver points (TRPs) of the transmitter UE, by using the repetition according to the SCI.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, processors 458, 464 and 466, and/or controller/processor 480 of the UE 120*a* and/or processors 420, 430, 438, and/or controller/processor 440 of the BS 110*a* shown in FIG. 4 may be configured to perform operations 800 of FIG. 8 and operations 900 of FIG. 9.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for selecting, means for monitoring and means for performing may include a processing system, which may include one or more processors, such as 458, 464 and 466, and/or controller/processor 480 of the UE 120*a* and/or processors 420, 430, 438, and/or controller/processor 440 of the BS 110*a* shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and/or 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a transmitter user equipment (UE), comprising:
   transmitting a sidelink control information (SCI) to reserve resources for data transmission to at least one receiver UE by using a repetition in at least one of time or frequency; and
   transmitting the data to the at least one receiver UE, via at least first and second transmitter receiver points (TRPs) of the transmitter UE, by using the repetition according to the SCI.

2. The method of claim 1, wherein the repetition is achieved via time division multiplexing (TDM) in which the at least first and second TRPs transmit a packet containing the data in different slots.

3. The method of claim 2, further comprising selecting a TRP for transmission in a given slot randomly, by cycling through TRPs, or by cycling through precoders that allocate transmission power across TRPs.

4. The method of claim 1, wherein the data transmission comprises transmitting repetitions of the same transport block (TB) from different transmission configuration indicator Transmission Configuration Indicator (TCI) states within one resource reservation window.

5. The method of claim 4, wherein the SCI comprises:
   a first stage SCI that indicates time and frequency resources for the data transmission; and
   the TCI states being indicated via at least one of a second stage SCI or a medium access control (MAC) control element (CE).

6. The method of claim 4, wherein the data transmission comprises transmitting a redundancy version (RV) for each hybrid automatic repeat request (HARQ) process or TCI state.

7. The method of claim 1, wherein the repetition is achieved by the at least first and second TRPs transmitting the data within a same slot.

8. The method of claim 7, wherein at least one of:
   a redundancy version (RV) iteration of each transmission of the data follows a certain pattern; or
   a second stage SCI is transmitted in each transmission of the data.

9. The method of claim 1, wherein the repetition is achieved via frequency division multiplexing (FDM).

10. The method of claim 1, wherein the SCI is transmitted on a first subchannel with the data transmission.

11. The method of claim 1, wherein:
    the SCI comprises an SCI repeated in both of two half transmissions.

12. The method of claim 1, wherein one or more fields in the SCI indicate a resource reservation pattern with multi-TRPs, including a transmission configuration indicator (TCI) state.

13. The method of claim 1, wherein the SCI indicates resources with a precoding resource block group (PRG) narrowband resource allocation scheme.

14. The method of claim 1, wherein the SCI indicates a wideband like transmission configuration indicator (TCI) state.

15. The method of claim 1, wherein the data transmission is repeated with multiple transmission configuration indicator (TCI) states.

16. A method for wireless communications by a receiver user equipment (UE), comprising:
    receiving, from a transmitter UE, a sidelink control information (SCI) to reserve resources for data transmission to at least a second UE by using a repetition in at least one of time or frequency; and
    monitoring for data transmitted from at least first and second transmitter receiver points (TRPs) of the transmitter UE, by using the repetition according to the SCI.

17. The method of claim 16, wherein the repetition is achieved via time division multiplexing (TDM) in which the at least first and second TRPs transmit a packet containing the data in different slots.

18. The method of claim 17, wherein the monitoring comprises monitoring for repetitions from TRPs selected by the transmitter UE for transmission in a given slot randomly, by cycling through TRPs, or by cycling through precoders that allocate transmission power across TRPs.

19. The method of claim 16, wherein the monitoring comprises monitoring for repetitions of the same transport block (TB) from different transmission configuration indicator Transmission Configuration Indicator (TCI) states within one resource reservation window.

20. The method of claim 19, wherein the SCI comprises:
a first stage SCI that indicates time and frequency resources for the data transmission; and
the TCI states being indicated via at least one of a second stage SCI or a medium access control (MAC) control element (CE).

21. The method of claim 19, wherein:
the monitoring comprises monitoring for a redundancy version (RV) for each hybrid automatic repeat request (HARQ) process or TCI state; and
the method further comprises performing combining to process different repetitions based on the redundancy versions.

22. The method of claim 16, wherein the repetition of the at least first and second TRPs is received within a same slot.

23. The method of claim 22, wherein at least one of:
a redundancy version (RV) iteration of each repetition follows a certain pattern; or
a second stage SCI is received in each repetition.

24. The method of claim 16, wherein the repetition is achieved via frequency division multiplexing (FDM).

25. The method of claim 16, wherein the SCI is transmitted on a first subchannel with the data transmission.

26. The method of claim 16, wherein:
the SCI comprises an SCI repeated in both of two half transmissions.

27. The method of claim 16, wherein one or more fields in the SCI indicate a resource reservation pattern with multi-TRPs, including a transmission configuration indicator (TCI) state.

28. The method of claim 16, wherein the SCI indicates resources with a precoding resource block group (PRG) narrowband resource allocation scheme.

29. The method of claim 16, wherein the SCI indicates a wideband like transmission configuration indicator (TCI) state.

30. The method of claim 16, wherein the data transmission is repeated with multiple transmission configuration indicator (TCI) states.

31. A transmitter user equipment (UE), comprising:
memory comprising instructions; and
one or more processors configured to execute the instructions and cause the transmitter UE to:
transmit a sidelink control information (SCI) to reserve resources for data transmission to at least one receiver UE by using a repetition in at least one of time or frequency; and
transmit the data to the at least one receiver UE, via at least first and second transmitter receiver points (TRPs) of the transmitter UE, by using the repetition according to the SCI.

32. The transmitter UE of claim 31, wherein the one or more processors are further configured to execute the instructions and cause the at least first and second TRPs to transmit a packet containing the data in different slots via time division multiplexing (TDM).

33. The transmitter UE of claim 32, wherein the one or more processors are further configured to execute the instructions and cause the transmitter UE to select a TRP for transmission in a given slot randomly, by cycling through TRPs, or by cycling through precoders that allocate transmission power across TRPs.

34. The transmitter UE of claim 31, wherein the one or more processors are further configured to execute the instructions and cause transmitter UE to transmit the data by transmitting repetitions of the same transport block (TB) from different transmission configuration indicator Transmission Configuration Indicator (TCI) states within one resource reservation window.

35. The transmitter UE of claim 34, wherein the SCI comprises:
a first stage SCI that indicates time and frequency resources for the data transmission; and
the TCI states being indicated via at least one of a second stage SCI or a medium access control (MAC) control element (CE).

36. The transmitter UE of claim 34, wherein the one or more processors are further configured to execute the instructions and cause the transmitter UE to transmit the data by transmitting a redundancy version (RV) for each hybrid automatic repeat request (HARQ) process or TCI state.

37. The transmitter UE of claim 31, wherein the one or more processors are further configured to execute the instructions and cause the at least first and second TRPs to transmit the date within a same slot.

38. The transmitter UE of claim 37, wherein at least one of:
a redundancy version (RV) iteration of each transmission follows a certain pattern; or
a second stage SCI is transmitted in each transmission.

39. The transmitter UE of claim 31, wherein the one or more processors are further configured to execute the instructions and cause the at least first and second TRPs to transmit a packet containing the data via frequency division multiplexing (FDM).

40. The transmitter UE of claim 31, wherein the one or more processors are further configured to execute the instructions and cause transmitter UE to transmit the SCI on a first subchannel with the data transmission.

41. The transmitter UE of claim 31, wherein:
the SCI comprises an SCI repeated in both of two half transmissions.

42. The transmitter UE of claim 31, wherein one or more fields in the SCI indicate a resource reservation pattern with multi-TRPs, including a transmission configuration indicator (TCI) state.

43. The transmitter UE of claim 31, wherein the SCI indicates resources with a precoding resource block group (PRG) narrowband resource allocation scheme.

44. The transmitter UE of claim 31, wherein the SCI indicates a wideband like transmission configuration indicator (TCI) state.

45. The transmitter UE of claim 31, wherein the one or more processors are further configured to execute the instructions and cause transmitter UE to repeat transmission of the data with multiple transmission configuration indicator (TCI) states.

46. A receiver user equipment (UE), comprising:
memory comprising instructions; and
one or more processors configured to execute the instructions and cause the receiver UE to:
receive, from a transmitter UE, a sidelink control information (SCI) to reserve resources for data transmission to at least a second UE by using a repetition in at least one of time or frequency; and
monitor for data transmitted from at least first and second transmitter receiver points (TRPs) of the transmitter UE, by using the repetition according to the SCI.

47. The receiver UE of claim 46, wherein the repetition is achieved via time division multiplexing (TDM).

48. The receiver UE of claim 47, wherein the one or more processors are further configured to execute the instructions and cause the receiver UE to monitor for repetitions from TRPs selected by the transmitter UE for transmission in a given slot randomly, by cycling through TRPs, or by cycling through precoders that allocate transmission power across TRPs.

49. The receiver UE of claim 46, wherein the one or more processors are further configured to execute the instructions and cause the receiver UE to monitor for repetitions of the same transport block (TB) from different transmission configuration indicator Transmission Configuration Indicator (TCI) states within one resource reservation window.

50. The receiver UE of claim 49, wherein the SCI comprises:
 a first stage SCI that indicates time and frequency resources for the data transmission; and
 the TCI states being indicated via at least one of a second stage SCI or a medium access control (MAC) control element (CE).

51. The receiver UE of claim 49, wherein:
 the one or more processors are further configured to execute the instructions and cause the receiver UE to:
  monitor for a redundancy version (RV) for each hybrid automatic repeat request (HARQ) process or TCI state; and
  perform combining to process different repetitions based on the redundancy versions.

52. The receiver UE of claim 46, wherein the one or more processors are further configured to execute the instructions and cause the receiver UE to receive the data transmitted from the at least first and second TRPs of the transmitter UE within a same slot.

53. The receiver UE of claim 52, wherein at least one of:
 a redundancy version (RV) iteration of each data transmission follows a certain pattern; or
 each data transmission comprises a second stage SCI.

54. The receiver UE of claim 46, wherein the repetition is achieved via frequency division multiplexing (FDM).

55. The receiver UE of claim 46, wherein the one or more processors are further configured to execute the instructions and cause the receiver UE to receive the SCI on a first subchannel with the data transmission.

56. The receiver UE of claim 46, wherein:
 the SCI comprises an SCI repeated in both of two half transmissions.

57. The receiver UE of claim 46, wherein one or more fields in the SCI indicate a resource reservation pattern with multi-TRPs, including a transmission configuration indicator (TCI) state.

58. The receiver UE of claim 46, wherein the SCI indicates resources with a precoding resource block group (PRG) narrowband resource allocation scheme.

59. The receiver UE of claim 46, wherein the SCI indicates a wideband like transmission configuration indicator (TCI) state.

60. The receiver UE of claim 46, wherein the one or more processors are further configured to execute the instructions and cause the receiver UE to receive the data transmission repeated with multiple transmission configuration indicator (TCI) states.

* * * * *